United States Patent [19]

Breyer

[11] 4,017,838
[45] Apr. 12, 1977

[54] DATA ENTRY AND RECORDING SYSTEM HAVING FIELD CORRECT CAPABILITY

[75] Inventor: Janice K. Breyer, Herndon, Va.

[73] Assignee: Honeywell Information Systems, Inc., Waltham, Mass.

[22] Filed: Sept. 19, 1974

[21] Appl. No.: 507,507

Related U.S. Application Data

[63] Continuation of Ser. No. 348,783, April 6, 1973, abandoned.

[52] U.S. Cl. ............................................ 340/172.5
[51] Int. Cl.[2] .......................................... G06F 7/22
[58] Field of Search .............................. 340/172.5

[56] References Cited

UNITED STATES PATENTS

| | | | |
|---|---|---|---|
| 3,654,611 | 4/1972 | Bluethman et al. | 340/172.5 |
| 3,657,706 | 4/1972 | Horgan et al. | 340/172.5 |
| 3,838,396 | 5/1972 | Martin | 340/172.5 |

*Primary Examiner*—Gareth D. Shaw
*Assistant Examiner*—C. T. Bartz
*Attorney, Agent, or Firm*—Ronald T. Reiling; John S. Solakian

[57] ABSTRACT

Data previously entered in storage is corrected or changed independent of the location in storage addressed at the time the operator desires or determines that a change is to be made to such previously entered data. Storage devices are coupled to store the address of such location presently addressed and the address of the location where the data is to be corrected or changed. In addition to means for changing such data, further means are provided to enable entry of data into a predetermined number of locations following that location where the data is first corrected or changed after which yet further means enables the last-mentioned location to be automatically addressed. The operator is then enabled to operate the system to for example verify the just entered data or may return to the operation of entering data from the original location addressed at the time the operator decided to make a change in the data.

2 Claims, 4 Drawing Figures

DATA ENTRY AND RECORDING SYSTEM HAVING FIELD CORRECT CAPABILITY

This is a continuation of application Ser. No. 348,783, filed Apr. 6, 1973, now abandoned.

BACKGROUND OF THE INVENTION

The present invention relates generally to data entry and recording systems and more particularly to a technique for correcting or changing data which has previously been recorded.

In data entry and recording systems having one or more keyboard entry devices coupled with data processing equipment in order to record keyed data in a storage device, the capability of correcting operator's errors and making updates to previously entered data is a necessary part of the system. For preferred operation, such capability must enable the operator to enter such data changes independent of the location addressed in such storage device at the time the operator must or desires to enter such changes. Furthermore, the operator must be allowed to enter such changes by means of simple and non-complicated operations. The system must accordingly accomplish such capability with automatic operation while maintaining a versatile approach to the solution of the problem.

It is known in the prior art to for example backspace to the location of previously entered data and to enter the desired data at that location. However the prior art does not include the capability of allowing such operation independent of the difference in addresses of the location at which the change is to be made and the location at which the operator was entering data when it was determined that a change was to be made. Furthermore, prior art systems which required reentry of data into a plurality of locations even though only the data in one location had to actually be changed, did not enable the automatic addressing of a desired address, such as the address at which data was changed, after the plurality of locations had data reentered therein. Also, such last-mentioned systems required that data be reentered starting from the beginning of a group comprising the plurality of locations. Further, simple and automatic means for returning to the entering of data at the location at which the operator stopped entering data in order to make such changes, has also not been provided.

It is accordingly an object of the present invention to provide an improved data entry and recording system having a field correct capability which provides automatic and efficient operations and allows such operations with minimal complexity imposed on the operator thereof.

SUMMARY OF THE INVENTION

The purposes and objects of the present invention are satisfied by providing a system which includes a storage medium such as magnetic core and/or magnetic tape and electronics for addressing the storage locations thereof. In addition to a keyboard for entering data, there is included first and second registers to facilitate the automatic operations of the present invention. A first register is utilized to store the address of the location into which the operator was to enter data at the time the operator decided to correct or update data in a previously addressed location of the storage medium. A second register is utilized to store the address of the location wherein data is to be changed. The storage of these addresses enables either automatic addressing of the location whose address is contained in the second register upon completion of the data change thereby facilitating yet further operation such as verification of the just changed data or enables the operator by use of a single key to address the location whose address is contained in the first register thereby facilitating the return to entering data. Field correct processing means allows the operator to correct or update the required data and to reenter the data for the remainder of a so-called "field" which includes a plurality of locations and which contains the just changed data. Further and with the aid of the second register, means for automatically addressing the location of the just changed data is enabled upon reentering the data in the last location of the field.

BRIEF DESCRIPTION OF THE DRAWINGS

The advantages of the foregoing configuration of the invention become more apparent upon reading the accompanying detailed description in conjunction with the figures in which.

DETAILED DESCRIPTION OF THE PREFERRED EMBODIMENTS

Figure 1:
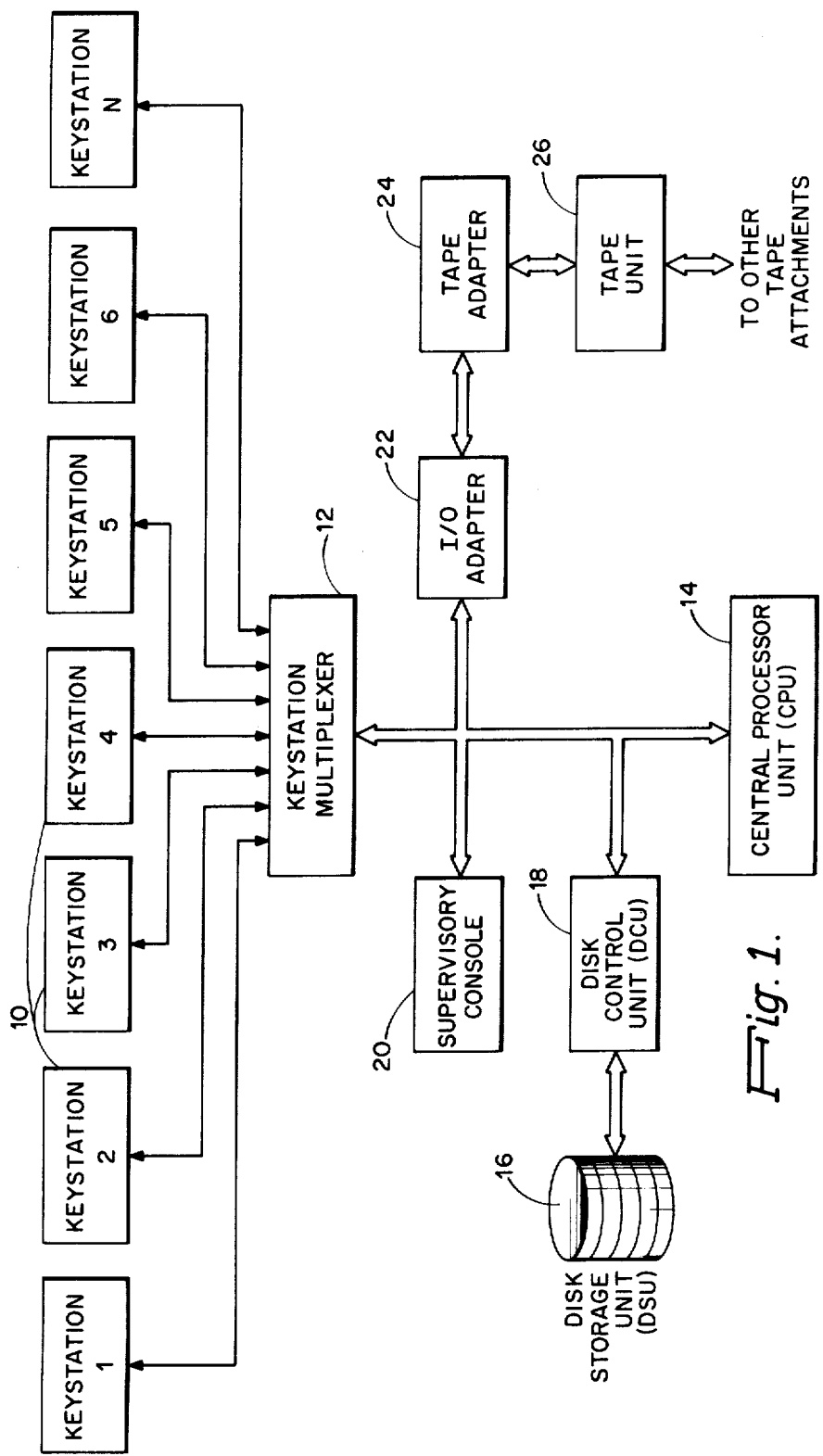
FIG. 1 is a general block diagram of a system incorporating the present invention.

FIG. 1 shows a multiple key station data entry system in block diagram form. The system consists of a plurality of key stations 10 through which data is entered. Each key station contains a keyboard and a display. The output of the key stations is fed to a key station multiplexer 12 through which the key stations share the logic, memory and mass storage of the central processor 14, in a time-sharing manner. As a character of data is entered into the system by striking a key on the keyboard, the key stroke is encoded into an 8 bit byte and stored in a time-shared register in the multiplexer. When a byte is stored, that byte is multiplexed in its turn, into the CPU. The CPU 14 accumulates a group of bytes in memory for each key station, and periodically, groups are transferred to mass storage, which in this case is a disk storage unit 16 accessed by means of a disk controller unit 18.

A transfer of data, in terms of format, is controlled by a supervisor's console 20 and the central processor. The supervisor's console may consist, for example, of an ASR Teletype console.

When a group of characters, which may be record or a batch, has been prepared and (optionally) verified from one or more key stations, the supervisory control 20 initiates each transfer of batch data from mass storage. The data is placed in a format which may be different from the input format, but which is compatible with the systems that will ultimately process the data, and is placed on a medium for transmission to that system under control of the central processing unit. The medium, in this case, may be magnetic tape contained on a tape drive unit 26 which is controlled through an input/output adaptor 22 and a tape drive adaptor 24. Obviously, by means of the I/O adaptor 22, any number nd/or type of peripheral device, for example a printer r communicator, may be attached to the system.

Briefly, each of the plurality of key stations 10 is perated independently, and is given access to all the ecessary system resources through software. Information is entered into the system on a unit record basis. ecords are accumulated sequentially until a batch is ompleted. Each record is prepared under control of a reviously defined format control which allows field efinition and editing. The batches may be verified in a milar manner.

After a batch has been entered, the keystation operator may switch into data verify mode. Each valid data ey pressed while in data verify mode will result in the orresponding character being compared with the haracter previously keyed in that position in the reord. If the two match, the character will be displayed ) the operator and the next available location will be isplayed an another operator display. In case of a ismatch, the previously keyed character is displayed nd a check indicator will be illuminated and the keyoard disabled.

The movement of data from the disk storage 16 is ontrolled from the supervisory control 20 when a job as been prepared and verified. The supervisor initiates transfer of that batch from the disk storage unit 16 to he output device or tape unit 26. The data is read from he disk storage 16 to the central processor 14 where it formatted for entry into the tape adaptor device. The ormat at output may be the same as the input format r may be highly modified.

As previously stated, the system is controlled and onitored by a supervisor through the supervisory onsole 20. The function of controlling and monitoring he system includes: (1) controlling and monitoring all obs, batches, (2) maintaining the format controlled brary, (3) relating formats to various jobs, (4) assigng batch numbers and disk storage areas, (5) monitorg disk storage to determine status, (6) initiating transr of data to peripheral devices, (7) restarting the ystem after system failure, (8) analyzing operator erformance.

To accomplish these functions, the supervisor comunicates with the system by means of the supervisory onsole ASR-33 teletypewriter keyboard. Communicaon is initiated by the supervisor by means of a key troke, which causes an interrupt to the CPU from the onsole.

The supervisory console has two basic modes of opration called input mode and output mode. These are et up by an appropriate instruction and once set up the ode will remain until changed by another instruction r by a master clear.

The input mode is used to transmit information from he ASR-33 keyboard to the CPU 14 or from the paper ape reader which is an integral portion of the ASR-33 nit, to the CPU. In either case, a printed copy is produced if the character is printable, and a control function is performed if the character is a control character. f characters are being read from the paper tape reader, ny of the characters appearing on the paper tape will e transmitted to the CPU.

The output mode is used to transmit information rom the CPU to the ASR-33 and/or paper tape punch. n either case, a printed copy is produced if the 8-bit haracter is printable, and a control function is perormed if the character is a control character. When punching, any code transmitted from the CPU is punched whether it is printable or not.

In either the input or the output mode either of two character modes (ASCII or binary) may be used. Code type is selected by individual instructions and may be intermixed.

The supervisory console 20, as has been discussed, allows supervision of the over all data entry system by controlling the operation of the central processor unit which, together with the disk control unit 18, the I/O adaptor 22, and the Keystation multiplexer 12 form the System Control Center.

The KMUX is a message multiplexer located in the system Control Center (SCC), which serves as an interface between the CPU 14 and the keystations 10. Multiplexing is initiated when the KMUX receives an entire message from a key station. The KMUX then presents the message to the CPU, and the CPU response is handled on a message basis. Data input transmissions are initiated by the key station and data output transactions are initiated by the CPU. Input and output transactions are completely independent of one another, but do not occur simultaneously.

The central processor unit of the system of the preferred embodiment may be, for example, a Honeywell H-316 general purpose digital computer. The H-316 is a solid-state 16-bit binary word, general purpose computer with an internally-stored program. The machine has fully-parallel organization and multi-level indirect addressing capabilities.

The standard CPU I/O mode consists of transfers of single characters or 16-bit words to and from the Aregister of the CPU. Input transfers are performed by INA instructions and output transfers by OTA instructions. Communication between CPU and other system units is accomplished by using a CPU I/O bus consisting of ten address lines.

As previously discussed, data is entered into the system through the keystation multiplexer by means of a plurality of keystations. Each keystation is connected to the keystation multiplexer by an individual, twisted-pair, input/output cable. Through this bidirectional cable, the keystation and the CPU exchange data, status and control signals. All transfer of input and output information is in serial bit stream format through the keystation multiplexer.

The keyboard area of the keystation contains both data and control keys. Control keys provide necessary control functions. If used as a switch, a control key operates in conjunction with indicators to display the switch setting. One control switch places the keyboard in control mode, allowing control functions to be actuated by means of the data key.

The display areas of the keystation are controlled by the CPU and the operating system software programs. Information derived from the keyboard data and control keys is processed by the CPU and operating system software before being returned to the keystation display indicators.

Information is entered into the data entry system on a unit record basis. Records are accumulated sequentially until a batch is completed. Each record is prepared under the control of a previously defined format control which allows field definition and editing. Each batch may be verified in a similar manner.

A character of data is entered in the system by striking a key on the keyboard. This key stroke is encoded into an 8-bit byte and stored in a keystation register.

The stored bytes are then multiplexed into the CPU which accumulates a group of bytes in memory for each keystation. Periodically, these groups are transferred to the disk storage unit, where the data for each batch is accumulated.

The movement of data from mass storage is controlled from the supervisor's console, as previously discussed, at the system control center. When a batch has been prepared and, (optionally) verified from one or more keystations, the supervisor can initiate a transfer of that batch from mass storage. The data is placed into a unit record format that is compatible with the system that will eventually process the data, and is placed on a medium (in this case magnetic tape) for transmission to that system, under control of the CPU.

It should be emphasized that the unit record format which ultimately recorded on the magnetic tape storage medium is not necessarily the same unit record format under which the data was keyed into the system from the keyboard. Software control of data allows extensive reformatting of data in units as small as field-length data units. A field may be defined as an assigned area in a record to be marked with information. A field is a group of one or more characters. Thus, the information keyed into the keystation is processed in two passes: first, the data is processed under control of a selected input format which may, for convenience correspond to the format arrangement of the source document from which the information is read by the operator. Second, after unit records of information are on the intermediate storage in the form of batches, selected fields of the data from each record of the batch may be combined in any number of supervisor selected formats under software control.

The status and display areas of the keystation are affected by key strokes in the keyboard area; however, the displays are controlled by the CPU which is governed by systems software and the format selected by the supervisor. Thus, as a key stroke is entered, it is multiplexed into the CPU and the format program for that specific column of the record is examined and, based on the directions contained therein, the key stroke is processed accordingly. After the key stroke has been processed, the CPU generates a reply message to the keystation which it sends back through the multiplexer to the keystation to update the display in the keystation display area. In the event that by the time the CPU (for example, in a very busy time period) generates the response message a new key stroke has been entered by the operator into that keystation, under software control the CPU may choose to destroy the first response and transmit a response to the next succeeding key stroke. This optional response by the CPU to the keystation is made possible because the input of the keystation (the striking of a data key) and the output to a keystation (the displays) are disassociated and the operating system software controls all responses based upon whether time permits the proper response to be made.

The keystation has four basic modes of operation: control, data entry, data verify, and data change. These modes and various submodes are controlled in the processor 14. The data entry, data verify and data change modes are the prime modes. The various submodes are entered via the control mode from any one of the three prime modes. Some of the various submodes are the display mode, insert record mode, delete record mode and the field correct mode. The field correct mode is the primary basis of the present invention and shall be presently discussed after general discussion of the four basic modes.

The control mode is used to set-up and prepare the keystation for a job operation. The operator's initials, job number, batch number, and batch type number are keyed in to open the keystation. The control mode is also used in subsequent operations to recall these numbers and the record number from the CPU.

The data entry mode permits the operator to key data into the CPU memory under the format control selected by the supervisor or the operator.

In data verify mode, the operator verifies the data previously entered in the data entry mode. It should be noted that verification of a specific job or batch may be performed by any keystation and is not limited to the keystation originally entering the data.

The data change mode is used to change the contents of a previously entered batch. Records can be inserted in the batch, deleted from the batch, or data changes can be made on records within the batch.

Figure 2:
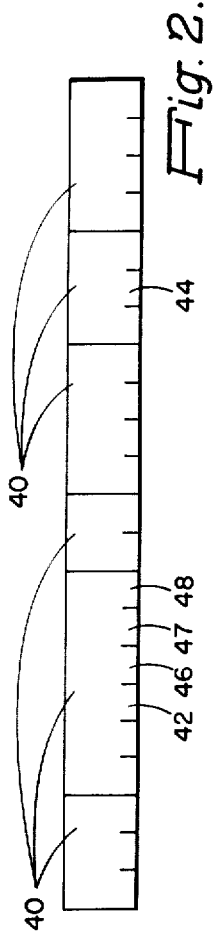
FIG. 2 is a diagram generally illustrating the format of fields in which the present invention is utilized to enter character changes.

Now with reference to the field correct mode, or submode, the problem presented and solved thereby shall be discussed with reference to FIG. 2. As previously discussed, a batch includes a plurality of records and a record includes a plurality of fields wherein each field may include one or more characters. In FIG. 2, several fields 40 of a record are shown. The problem is to be able to change data in a field which has previously had data entered therein and to do so in an efficient manner independent of the position at which the operator is entering data at the time the operator is required to or determines that such change must be made. FIG. 2 illustrates a character location 44 at which for purposes of illustration it is presumed that the operator is presently entering data. It is understood that the operator may have been entering data in a different record or batch. Thus with the operator ready to key at character location 44 the operator discovers that a data change must be made in character location 42. To avoid confusion, it should be understood that location 44 is not two locations after location 42, but that as shall be discussed, locations 46, 47 and 48 actually directly follow location 42. By the present invention, means are provided to backspace a batch, record, field or character at a time to location 42. At that point the new character or corrected character is typed into location 42 after which the operator must continue entering data into positions 46, 47 and 48 to the end of the field. The operator is not required to go to the beginning of the field in which character location 42 is located but is required to reenter the same or different data into the subsequent locations to the end of the field in which character location 42 is located. After the character has been reentered in character location 48, means are provided in the present invention to automatically return to location 42. This provides the operator with the automatic positioning so that if the operator so desires, he may verify the contents of the characters just entered in locations 42, 46, 47 and 48. Means are also provided in the present invention to return automatically to the location 44 either from location 42 or from location 48 or any other location as desired.

Figure 3:
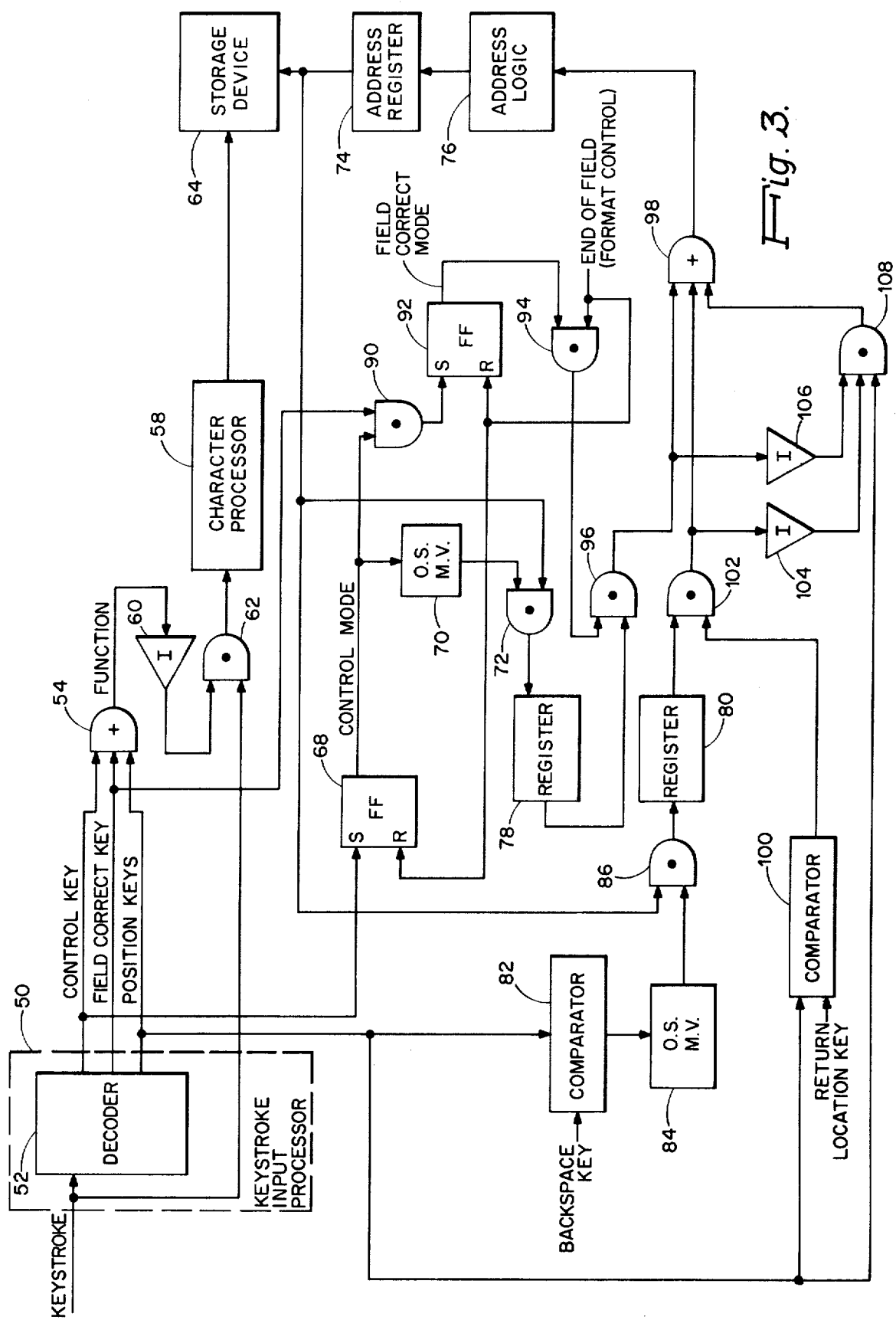
FIG. 3 is a schematic block diagram of the apparatus of the present invention.
Figure 4:
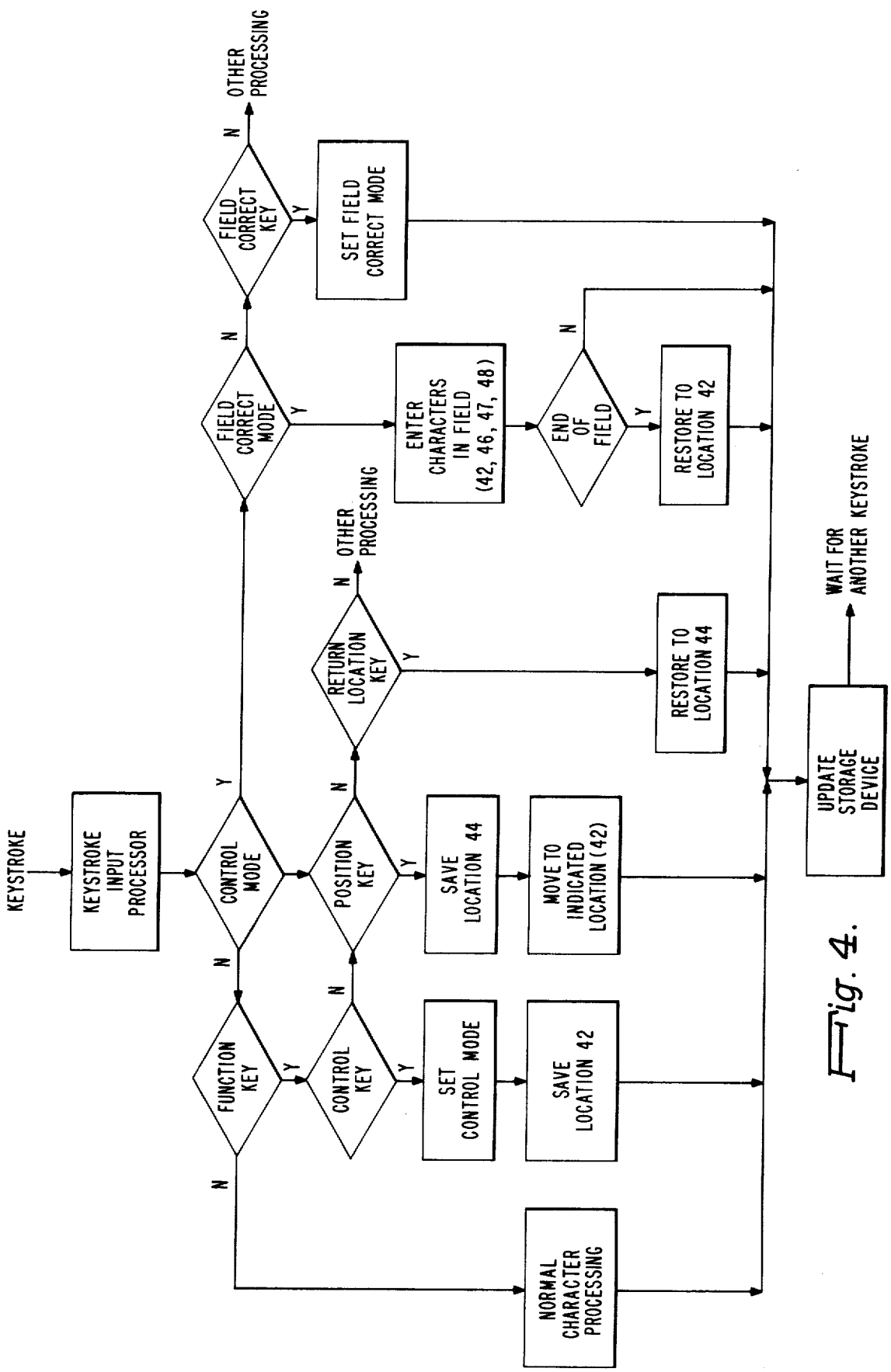
FIG. 4 is a state diagram illustrating the operation of the present invention.

Now with reference to FIG. 3, special purpose logic which may be used in place of the central processing unit 14 for the purposes of the field correct mode is illustrated. The operation of the field correct mode is also shown in conjunction with the state diagram of FIG. 4. Accordingly, the logic and diagram of FIGS. 3 and 4 respectively will be presently discussed.

When a key stroke is received, it is processed by the key stroke input processor 50, which functions to decode the key stroke character, check the character received such as for example, a parity check, and functions to provide the necessary hand-shaking signals with the key station. For the purposes of the present invention, only the decode function is discussed. Accordingly, the key stroke input processor 50 includes a decoder 52 which functions to present an output signal to OR-gate 54 if either a control, field correct, or position keys are detected. It is noted that the position keys include more than one key, such as for example a forward and a back-space character key, a back-space field key, a back-space record key, etc. Actuation of any one of these groups of keys generates a function signal at the output of OR-gate 54. Generation of the function signal will inhibit character processing provided by character processor 58. This is accomplished by means of inverter 60 and AND gate 62, which gate has as one input the key stroke received from the key station and which has as its other input an inhibiting signal when the function signal is generated. If a function signal is not generated at the output of OR-gate 54, then the key stroke will be processed as a normal character. Processor 58 may be any well known device which is coupled to for example provide any necessary code conversion for the character received and any necessary stripping of characters in order that the character may be placed in the designated location of storage device 64. Storage device 64 may include the core or semiconductor storage included in the central processing unit 14 and/or the disk storage unit 16. Storage device 64 may also be said to include the tape unit 26. In parallel with the entry of characters in storage device 64, the characters may also be sent back to the display portion of the key station.

Control mode flip-flop 68 is set when the control key signal is detected by decoder 52 designating that the system is in the control mode. This setting of flip-flop 68 enables entry of any one of the aforementioned sub-modes including the field correct mode.

Thus, when a key stroke is received, it is processed by key stroke input processor 50, after which a determination is made as to whether or not the apparatus system is in the control mode. If not, the question is then asked whether a function key was depressed. If the answer is negative, then normal character processing proceeds via character processor 58 and the storage device receives a character. If a function key was depressed, then the normal character processing is inhibited and the system is allowed to enter the control mode if the control key has been depressed. However, prior to depressing the control key, and with the operator addressing a location, during a time when the operator determines that a correction must be made to another location, the operator then must position back to the location to be corrected. By way of example as shown in FIG. 2, the present operator location is location 44 and the location to be positioned to is location 42. Thus when the operator first depresses a position key, the location 44 must be saved. This is accomplished by the use of comparator 82 which generates and latches a signal when a prewired back-spaced key signal corresponds to the first of any one of the back-space keys depressed at the key station during the present field correct operation. The latched signal from comparator 82 generates a momentary signal via one-shot multivibrator 84, the output of which enables AND gate 86 to enable the transfer of the address location 44 from the address register 74 into register 80. After the field correct operation, the comparator 82 may be unlatched such as by the end of field signal in order to prepare for the next field correct operation.

With the address for location 44 now saved in register 80, the operator may thus backspace to position 42 and then depress the control key to allow the saving of the location 42 to be corrected and to allow the system to go into the control mode. Once the system is in the control mode, any one of the submodes including the field correct mode may be entered. Location 42 may be saved and the control mode may be entered by setting flip-flop 68 in response to the control key signal from decoder 52. The signal responsive to the control mode signal at the output of flip-flop 68, sets one-shot multivibrator 70 and produces a momentary signal in order to enable AND gate 72. This allows the address of the new location back-spaced to, namely by way of example location 42, to be entered into register 78 via AND gate 72. Thus, location 42 is saved in register 78 in response to the depression of the control key and the control mode is then entered. With the control mode set, the operator may now depress the field correct key. This sets the field correct mode by the full enabling of AND gate 90 which when enabled sets field correct mode flip-flop 92.

Having set the field correct mode, the operator is now free to enter characters into the location to be corrected namely location 42 by our example and through the remainder of the field containing location 42. Thus, the operator enters characters into locations 42, 46, 47 and 48. These characters are entered via the character processor 58 into storage device 64 to the addresses designated until the end of the field containing character location 42 has had data reentered therein. The detection of the end of the field may be accomplished by means of the format control provided by the supervisory console 20 which provides a signal together with the field correct mode signal to enable the contents of register 78 which has saved the address of location 42 to pass such address information into the input of address logic 76 thereby directing address register 74 to again address the location 42 so that the operator now is able to for example perform a verify operation upon the characters just entered into the field containing location 42. The above operation is accomplished by the enabling of AND gate 94 and the further enabling of AND gate 96 to pass the address information from register 78 via OR gate 98 to logic 76. The end of field signal from the format control also resets flip-flops 68 and 92 so that the control mode and the field correct mode are no longer active. The end of field signal may also be used to unlatch comparator 82.

After the operator has returned to address location 42 and/or after the operator has verified the characters beginning from location 42 and ending at location 48, the operator is then free to return to that location 44 at which the operator was keying at the time the operator decided to make a correction at location 42. This is accomplished by depressing the return location key, the occurrence of which is detected by comparator 100 to produce a signal which enables AND gate 102 to pass the address information in register 80 now containing an address for location 44 to address logic 76 via OR gate 98. This restores the operator to position 44 so that the operator can continue entering data or perform any other function that the operator so desires.

In addition to receiving address information from registers 80 and 78, address logic 76 is coupled to receive address information directly from the positioning key information, when AND gates 96 and 102 are not enabled. This function is provided by the logic indicated as inverters 104 and 106 which are coupled to provide a signal when their respective associated AND gates are not enabled and which are coupled to enable the passing of the position information through AND gate 108. The address information received at the output of AND gate 108 is coupled to address logic 76 also via OR gate 98.

Thus there has been shown a data entry and recording system having means for easily facilitating corrections to a character independent of the position at which the operator is keying at the time such correction is to be made. Means have also been shown for facilitating the verification of the changed or entered data in a field by use of an automatic positioning technique to the first character location changed in the field. Further means have also been shown for again facilitating the keying at the location at which the operator was initially entering data.

Accordingly, having described the invention, what is claimed as new and novel and for which it is desired to secure Letters Patent is:

1. In a data entry and correction system comprising at least one data entry means and a processor including storage means having a plurality of locations, each of said locations having a unique address, means for addressing said locations in said storage means, means, included in said data entry means, said processor and said means for addressing and responsive to a determination by decoder means that data received by means of said data entry means in a data character, for entering said data received in one of said locations of said storage means, first and second registers and said decoder means, a method for entering and correcting data comprising the steps of:
   A. determining, by means of said decoder means, whether data received from said data entry means is a function character or a said data character, said function character indicating that data correction is to be performed;
   B. storing in said first register the address of a one of said locations in said storage means in which a data character was last entered, said last-mentioned location hereinafter referred to as said latest location, and wherein said method further comprises the following method steps upon determining that said data received is a function character;
   C. addressing, by means of said means for addressing, a one of said locations in said storage means in which a said data character has been previously incorrectly entered and which is to be corrected, said last-mentioned location hereinafter referred to as the update location;
   D. storing the address of said update location in said second register;
   E. entering, by means of said data entry means and by means of said means for addressing in response to the address stored in said second register, the correct data character in said update location;
   F. reentering, by means of said data entry means, previously entered data characters in a predetermined number of locations following said update location;
   G. automatically addressing, by means of said means for addressing and in response to the address stored in said second register, said update location immediately after reentering data in the last location of said predetermined number of locations;
   H. detecting that said update location has been addressed during said step of automatically addressing; and
   I. addressing, in response to the detection that said update location has been automatically addressed, said latest location whose address is contained in said first register, whereby an operator may proceed to enter a data character beginning with a one of said locations succeeding said latest location after said data correction has been performed.

2. A method as in claim 1 wherein said plurality of locations in said storage means are grouped in fields, each field having several locations, and wherein said locations following said update location are included in and limited to those locations in the field of locations containing said update location, said method step of reentering data characters including the step of indicating that the last location of said field of locations having said update location therein has had a data character entered therein; and wherein said method step of automatically addressing is responsive to the indication provided by said step of indicating.

* * * * *